(No Model.)
J. STEPHENS.
PULVERIZING, SEEDING, AND FERTILIZING HARROW.
No. 283,160.
Patented Aug. 14, 1883.
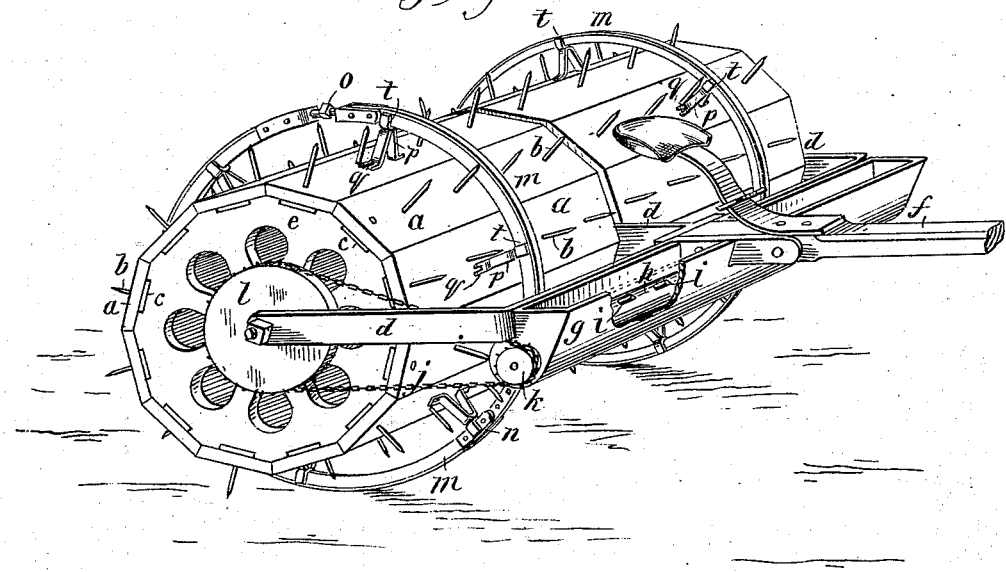
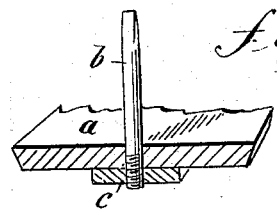
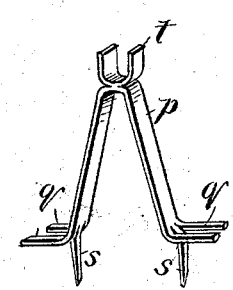
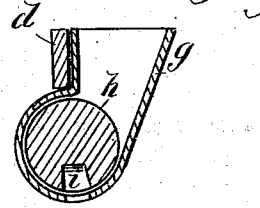
WITNESSES:
INVENTOR:
BY
ATTORNEYS.

UNITED STATES PATENT OFFICE.

JOHN STEPHENS, OF HANOVERTON, OHIO.

PULVERIZING, SEEDING, AND FERTILIZING HARROW.

SPECIFICATION forming part of Letters Patent No. 283,160, dated August 14, 1883.

Application filed March 29, 1883. (No model.)

*To all whom it may concern:*

Be it known that I, JOHN STEPHENS, of Hanoverton, in the county of Columbiana and State of Ohio, have invented a new and Improved Pulverizing, Seeding, and Fertilizing Harrow, of which the following is a full, clear, and exact description.

The invention consists of the combination and arrangement of parts substantially as hereinafter fully set forth and claimed.

Reference is to be had to the accompanying drawings, forming part of this specification, in which similar letters of reference indicate corresponding parts in all the figures.

Figure 1 is a perspective view of my improved machine. Fig. 2 is a detail in section, showing the manner of connecting the teeth. Fig. 3 is a detail of the devices for connecting the wheel-rims in perspective view; and Fig. 4 is a detail of the seed-dropper, in section.

I make the revolving drums similar to rollers, except the shells are of flat sections of planks $a$, in which the teeth $b$ are inserted by screwing through the planks into a metal bar, $c$, which has tapped holes to serve for nuts to secure the teeth, each plank or section having one row of teeth, and the planks being suitably secured to cast-iron or other approved heads $e$, which are suitably journaled in the frame-bars $d$, to which the tongue $f$ is secured, and which will in practice extend beyond the back of the drums and have a connecting-bar behind them to balance the tongues.

With a rotary harrow of this construction, which I find to be very serviceable as a clod-pulverizer, in consequence of the forward and backward play or swing of the teeth in entering and in leaving the ground, I propose to employ a seeding and fertilizing attachment, consisting of the trough $g$, for holding the seed or other substance, and the rotary dropper $h$, containing pockets $i$, for dropping, and being geared with one of the drums to be revolved thereby, thus making a simple contrivance for seeding or fertilizing and harrowing in the seed or fertilizer.

The dropper $h$ may be geared with the drum by the chain $j$ and pulleys $k$ $l$, or any approved means, and the pockets may be varied in capacity by means of blocks, to be put in or taken out as required for the different kinds of seeds or other substance to be dropped.

I find a harrow of this kind to be very useful in preparing the ground of growing wheat for seeding with grass-seed, thus being a practicable wheat-cultivator, and, by removing some of the center rows of teeth, it may be used with good results for cultivating corn when quite young.

For a means of readily transporting this harrow I propose to employ wheel-rims $m$, made in sections, jointed together at $n$, and fitted with right and left connecting-screws, $o$, together with detachable bracket-arms $p$, having feet $q$ and points $s$, for connection to the drum, and notch $t$, for the rims to rest in, whereby the rims may be readily applied to the drums and removed therefrom as may be needed to prepare the harrow for removal from place to place and for service in the field.

For small rollers to be worked by hand for garden use I propose to insert the teeth in simple plain rollers, of wood, instead of the above-described arrangement of hollow rollers and screw-connection for the teeth.

Having thus described my invention, I claim as new and desire to secure by Letters Patent—

1. The combination of detachable wheel-rims $m$ with a revolving drum-harrow, substantially as described.

2. The combination of the jointed wheel-rims $m$, connecting-screws $o$, and the detachable bracket-arms $p$, with the revolving drum-harrow, substantially as described.

JOHN STEPHENS.

Witnesses:
DAN S. WEAVER,
A. SHIRSBY.